US010976442B1

(12) United States Patent
Zhodzishsky et al.

(10) Patent No.: US 10,976,442 B1
(45) Date of Patent: Apr. 13, 2021

(54) METHOD AND APPARATUS FOR BUILDING VIBROSTABLE GNSS RECEIVERS TO RECEIVE AND PROCESS NAVIGATION SIGNALS FROM MULTIPLE NAVIGATION SYSTEMS

(71) Applicant: Topcon Positioning Systems, Inc., Livermore, CA (US)

(72) Inventors: Mark Isaakovich Zhodzishsky, Moscow (RU); Ilya Vladimirovich Ivantsov, Moscow (RU); Roman Valerievich Kurynin, Moscow (RU); Alexey Stanislavovich Lebedinsky, Moscow (RU); Vladimir Victorovich Beloglazov, Moscow (RU)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 0 days.

(21) Appl. No.: 16/976,338

(22) PCT Filed: Jan. 28, 2020

(86) PCT No.: PCT/RU2020/000038
§ 371 (c)(1),
(2) Date: Aug. 27, 2020

(51) Int. Cl.
*G01S 19/33* (2010.01)
*G01S 19/37* (2010.01)

(52) U.S. Cl.
CPC .............. *G01S 19/33* (2013.01); *G01S 19/37* (2013.01)

(58) Field of Classification Search
CPC .......... G01S 19/33; G01S 19/37; G01S 19/23; G01S 19/29; G01S 19/35–37
See application file for complete search history.

(56) References Cited

U.S. PATENT DOCUMENTS 6,313,789 B1 11/2001 Zhodzishsky et al.
8,618,981 B2 12/2013 Zhodzishsky et al.
(Continued)

FOREIGN PATENT DOCUMENTS

CN 101303403 A 11/2008
WO 2017137878 A1 8/2017

OTHER PUBLICATIONS

A. V. Veytsel, "Update of Navigation Receivers Characteristics with the use of the Future Long-Range GNSS Signals," 2013, Siberian Journal of Science and Technology, vol. 6, No. 52, https://vestnik.sibsau.ru/arhiv, pp. 42-49.
(Continued)

*Primary Examiner* — Cassi J Galt
(74) *Attorney, Agent, or Firm* — Chiesa Shahinian & Giantomasi PC

(57) ABSTRACT

A method and apparatus are provided for processing navigation signals with improved stability in a multi-frequency, multi-system environment. Satellite signals, which are transmitted by a plurality of satellites from a plurality of different global navigation satellite systems, are received on a common radio path and processed in separate digital satellite channels, with each of the separate digital satellite channels corresponding to a respective satellite signal. A common quartz-locked-loop (QLL) discriminator signal is generated based on correlation signals from each of the separate digital satellite channels. Based on the common QLL discriminator signal, guiding signals are generated, with each of the guiding signals corresponding to a respective one of the separate digital satellite channels, for reducing phase-related tracking errors in the respective satellite signal processed in its corresponding digital satellite channel.

18 Claims, 4 Drawing Sheets

(56) References Cited

U.S. PATENT DOCUMENTS

| | | | |
|---|---|---|---|
| 9,618,626 B2* | 4/2017 | Veitsel | G01S 19/24 |
| 2005/0116857 A1* | 6/2005 | Martin | G01S 19/40 |
| | | | 342/357.23 |
| 2011/0260916 A1 | 10/2011 | Zhodzishsky et al. | |
| 2018/0329073 A1 | 11/2018 | Antonov et al. | |

OTHER PUBLICATIONS

Schafer et al., "A Four-Channel GNSS Front-End IC for a Compact Interference-and Jamming-Robust Multi-Antenna Galileo GPS Receiver," 2014, 2014 7th ESA Workshop on Satellite Navigation Technologies and European Workshop GNSS Signals and Signal Processing (NAVITEC), Publisher: IEEE, https://ieeexplore.ieee.org/abstract/document/7045150, pp. 1-6.

* cited by examiner

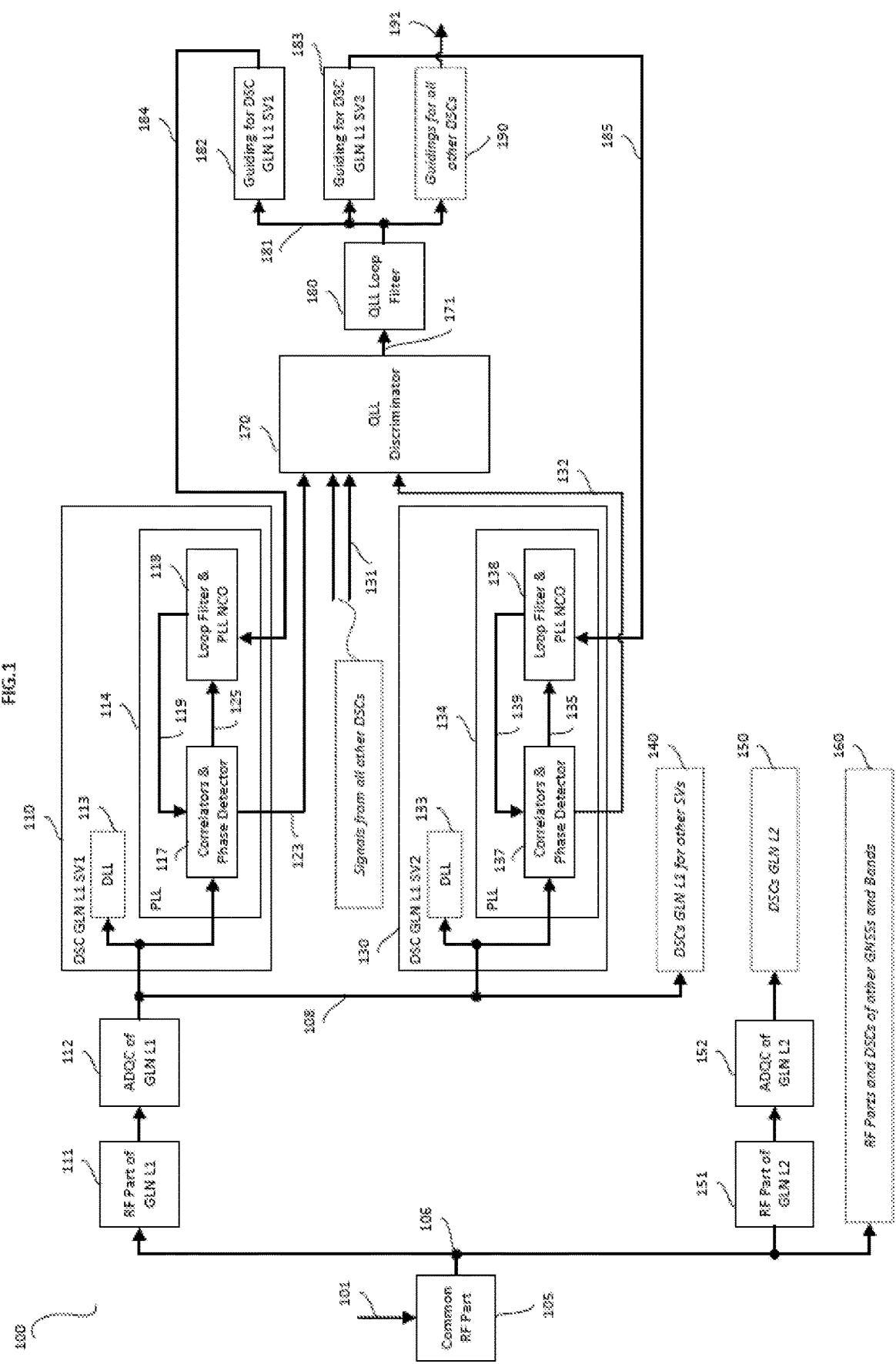

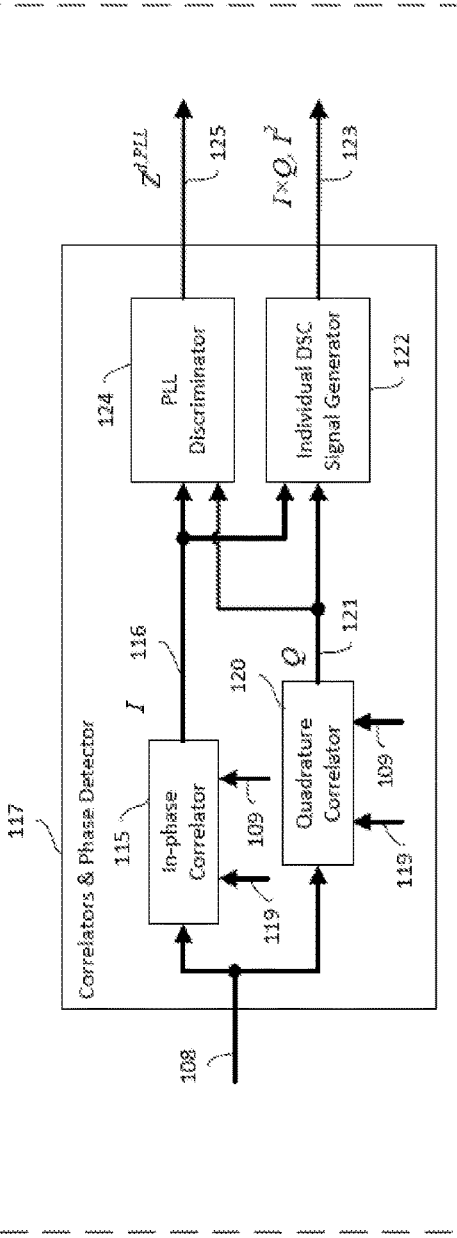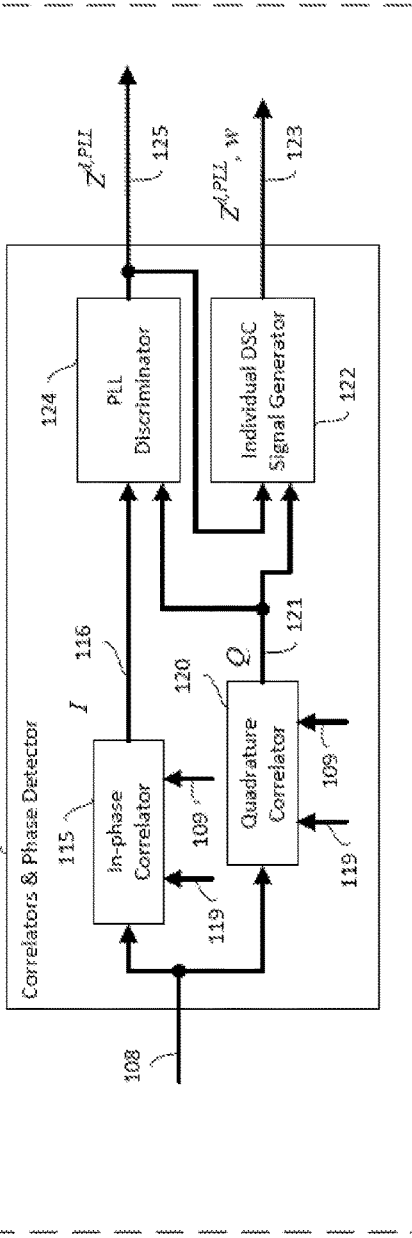

METHOD AND APPARATUS FOR BUILDING VIBROSTABLE GNSS RECEIVERS TO RECEIVE AND PROCESS NAVIGATION SIGNALS FROM MULTIPLE NAVIGATION SYSTEMS

TECHNICAL FIELD

The present invention relates generally to signal processing in global navigation satellite systems, and more particularly to a method and apparatus for processing satellite signals with improved stability in a multi-frequency, multi-system environment.

BACKGROUND

Navigation receivers are used to receive radio signals from a plurality of navigation satellites and further process the signals to determine the location of a user, device, equipment, or machinery. In one example, the location (coordinates) of a movable device such as a rover can be determined with the use of code and phase measurements from the received radio signals. However, during operation, a navigation receiver installed on the rover may be subjected to strong dynamic disturbances as a result of shaking, shocks and vibrations during movement or from activities of working assemblies. Such dynamic disturbances affect the quartz crystal of the reference oscillator, thereby causing unwanted frequency drift and loss-of-lock, which can result in a failure in the receiver tracking system.

In particular, quartz oscillators are known to be very sensitive to accelerations resulting from shock, rotation, vibrations, movements and inclinations, any of which can negatively affect the frequency stability of the quartz oscillator. Such conditions can be particularly problematic in navigation receivers that require high-precision oscillators. For example, navigation systems are now used extensively in the operation of heavy equipment (e.g., moving machines) for construction and agricultural applications, with such operating equipment including an on-board navigation receiver to facilitate precision-guided excavation, road repair, crop harvesting or any number of other tasks. Given the nature of the service conditions in these applications, shock and vibration-induced effects can therefore degrade the precision of the navigation receivers and negatively impact performance of the equipment relying on such precision for operation.

One approach for mitigating the aforementioned effects includes the use of a feedback loop in the navigation receiver to reduce tracking errors from frequency fluctuations of the reference oscillator. However, known solutions that employ such a feedback loop, such as a quartz-locked-loop (QLL), are limited to a single-frequency, single system environment, e.g., a navigation receiver that operates in one frequency band in one particular global navigation satellite system.

SUMMARY

These and other issues are addressed in accordance with various embodiments for processing navigation signals with improved stability in a multi-frequency, multi-system environment. According to an embodiment, a method is provided for processing satellite signals received from a plurality of satellites from a plurality of different global navigation satellite systems. The satellite signals are received on a common radio path and processed in a plurality of separate digital satellite channels, wherein each of the separate digital satellite channels corresponds to a respective one of the plurality of satellite signals. A common quartz-locked-loop (QLL) discriminator signal is generated based on correlation signals from each of the separate digital satellite channels. Based on the common QLL discriminator signal, a plurality of guiding signals are generated, with each of the plurality of guiding signals corresponding to a respective one of the separate digital satellite channels, for reducing phase-related tracking errors in the respective one of the plurality of satellite signals processed in a corresponding one of the separate digital satellite channels.

According to an embodiment, an apparatus is provided for processing satellite signals received from a plurality of satellites from a plurality of different global navigation satellite systems. The apparatus includes a radio frequency processor that is configured to receive a plurality of satellite signals on a common radio path and a plurality of separate digital satellite channels, each configured to process a respective one of the plurality of satellite signals. A quartz-locked-loop (QLL) discriminator is configured to generate a common QLL discriminator signal based on correlation signals from each of the separate digital satellite channels. A QLL loop filter with consequently-connected guiding generators are configured to generate a plurality of guiding signals based on the common QLL discriminator signal, each of the plurality of guiding signals corresponding to a respective one of the separate digital satellite channels, for reducing phase-related tracking errors in the respective one of the plurality of satellite signals processed in a corresponding one of the separate digital satellite channels.

BRIEF DESCRIPTION OF THE DRAWINGS

FIG. 1 is a block diagram of a navigation receiver apparatus in accordance with one or more embodiments;

FIGS. 2A and 2B are block diagrams illustrating examples of a Correlators and Phase Detector block for a Phase-Locked Loop (PLL) component for the device shown in FIG. 1 in accordance with various embodiments;

DETAILED DESCRIPTION

Figure 3:
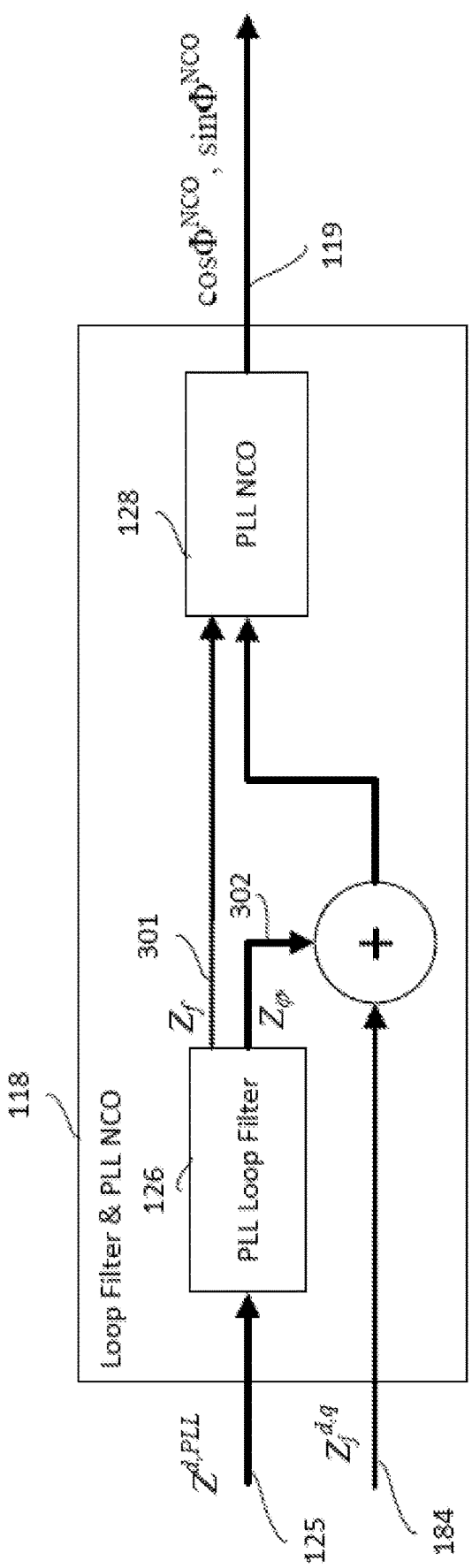
FIG. 3 is a block diagram illustrating features of a PLL Loop Filter and PLL Numerically-Controlled Oscillator (NCO) block in a PLL component for the device shown in FIG. 1 in accordance with one or more embodiments.

Various illustrative embodiments will now be described more fully with reference to the accompanying drawings in which some of the illustrative embodiments are shown. It should be understood, however, that there is no intent to limit illustrative embodiments to the particular forms disclosed, but on the contrary, illustrative embodiments are intended to cover all modifications, equivalents, and alternatives falling within the scope of the claims. Where appropriate, like numbers refer to like elements throughout the description of the figures. It will be understood that, although terms such as first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term "and/or" includes any and all combinations of one or more of the associated listed items.

As described, navigation receivers employing a feedback loop (e.g., QLL) according to prior solutions can reduce tracking errors caused by frequency fluctuations of the reference oscillator when operating in one-band, single system environments (e.g., in the case of GPS, L1 band only). Theoretically, these solutions could be extended to the case of a multi-frequency, multi-system receiver. However, direct application of a single QLL can lead, in some cases, to inefficient operability and even cause the receiver to stop working. Alternatively, a receiver implemented with several QLLs, e.g., with one QLL associated with each frequency band of each GNSS, may provide some positive effects. However, efficiency can be significantly increased (e.g., especially for a receiver with a quartz oscillator with poor frequency stability operating in more severe vibro-dynamic operating conditions) by using one common QLL for all GNSS systems and for all frequency bands instead of a set of separate independent QLLs. However, the development of such a common QLL, free from the aforementioned drawbacks, is a non-trivial task. According to the various embodiments herein, a common QLL implementation is provided that solves the aforementioned issues and challenges.

According to various embodiments, navigation receiver apparatus 100 in FIG. 1 addresses the shortcomings of prior solutions when processing satellite signals transmitted on different frequencies from a plurality of global navigation satellite systems (GNSSs), e.g., different frequencies or bands from the same GNSS system, from different GNSS systems, and various combinations thereof. According to the various embodiments described herein, a common loop is implemented to generate a guiding signal to each of the separately processed digital satellite channels (DSCs) that correspond to the different frequencies, bands, and/or GNSS systems.

Various global navigation satellite systems (GNSSs), including the United States Global Positioning System (GPS), the Russian Global Navigation Satellite System (GLONASS), the European Galileo system, the Chinese BeiDou system, and others are used for determining the location of devices/users equipped with special navigation receivers.

A navigation receiver receives and processes radio signals emitted by satellites within its line-of-sight. Signals from the satellites are modulated using a pseudo-random (PR) binary code, which is used for measuring the delay relative to a local reference oscillation. These measurements allow for the determination of pseudo-ranges that differ from the actual (true) ranges to the satellites, which result from time scale differences between the on-board clock of the satellite and the receiver, as well as from measurement errors. In a navigation receiver according to the disclosed embodiments, signals from different satellites are separated into channels and are processed to isolate and extract navigation information, which is contained in the value of the relative time delays between incoming signals.

More specifically, as shown in FIG. 1, a common radio frequency (RF) input signal 101 is received at the input of navigation receiver apparatus 100 from an antenna (not shown) via a common RF block 105 (e.g., a common RF processor) and then fed to a common radio path 106, which is common to the satellite signals from different satellites of different GNSSs. The common radio path 106 typically would include filtering blocks, frequency converters, ADC conversion blocks and so on for separating the common RF input signal 101 into satellite signals corresponding to the different frequency bands (and/or GNSS systems). For the example shown in FIG. 1, satellite signals corresponding to the L1 frequency band of a GLONASS system are filtered and processed through RF block 111 and ADC block 112, satellite signals corresponding to the L2 frequency band of the GLONASS system would be processed through RF block 151 and ADC block 152, and so on. Once the satellite signals have passed through the common radio path 106 and the associated filtering and conversion blocks (e.g., 111/112), the satellite signals 108 can then be separately processed in respective digital satellite channels (DSCs), such that there is a one-to-one correspondence between a digital satellite channel and a satellite signal.

The configuration in FIG. 1 shows the multi-frequency, multi-band, multi-system capability of navigation receiver apparatus 100. For example, DSCs 110 and 130 correspond to respective satellite signals with two different frequencies within the same frequency band of a first type GNSS system, e.g., two frequencies in the L1 band of a GLONASS system. For ease of illustration, blocks 140, 150 and 160 do not show specific components therein, but may include similar RF and signal processing components as shown in DSCs 110 and 130. As shown in FIG. 1, block 140 may correspond to one or more DSCs for other satellite signals with frequencies in the same frequency band L1 of the same GNSS system corresponding to DSCs 110 and 130 (e.g., one or more other frequencies (and corresponding DSCs) for the L1 band of the GLONASS system). In this example, block 150 is shown to correspond, for example, to one or more satellite signals with frequencies (and corresponding DSC channels) for the L2 band of a GLONASS system. Block 160 is shown to correspond, for example, to one or more satellite signals with frequencies (and corresponding DSC channels) for other frequency bands and/or other GNSS systems (e.g., GPS, Galileo, etc.). It should be noted that the configuration in FIG. 1 is only meant to be illustrative and not limiting in any manner. Various other combinations of satellite signals with different frequencies, within the same or different frequency bands, from the same or different GNSS systems, and so on are contemplated by the teachings herein.

Each of DSCs 110 and 130 include two tracking systems that are operable to track changes in the parameters of the incoming satellite signal. The first tracking system is a delay-locked loop (DLL) that is configured to track changes (variations) in the delay of the modulating pseudo-random code in the incoming satellite signal. The DLL blocks are labeled as blocks 113 and 133 for DSCs 110 and 130, respectively. Various implementations are known for DLL blocks 113 and 133 and may be suitably used with the embodiments described herein. The second tracking system is a phase-locked loop (PLL) that tracks changes in the phase of the carrier of the incoming satellite signal, which will be described in further detail herein. In navigation receiver apparatus 100, PLL block 114 corresponds to DSC 110 and PLL block 134 corresponds to DSC 130.

In order to implement the DLL and PLL tracking systems within DSCs 110 and 130, the incoming RF signal is converted into digital form and processed, using both hardware and firmware (e.g., in the processor of the navigation receiver). Processing of the received signal includes storing results of successive multiplication of this signal by the reference carrier and the reference code that is generated in the receiver. The reference carrier corresponds to the received carrier signal for the given satellite, and the reference code corresponds to the respective pseudo-random code (PR code) that was used for modulating the carrier signal of the given satellite. The devices performing this multiplication and storage function are referred to as correlators, and the corresponding process is referred to as the correlation of two signals. The output value of a correlator is determined by a cross-correlation function of the input and reference signals. Each DSC (e.g., DSCs 110, 130, etc.) in navigation receiver apparatus 100 comprises several parallel processing paths and associated correlators.

As shown in FIG. 1, PLL block 114 includes Correlators & Phase Detector block 117 and a Loop Filter & PLL NCO (numerically-controlled oscillator) block 118. Correlators & Phase Detector block 117 generates an error signal 125 in the PLL circuit (block 114) as well as individual DSC signals (e.g., signal 123), both of which will be described in further detail below.

FIGS. 2A and 2B show two examples of Correlators & Phase Detector block 117 in further detail. The configurations of Correlators & Phase Detector block 117 in FIGS. 2A and 2B are similar, except for the input to Individual DSC Signal Generator block 122, which will be described in further detail below. Explanations for commonly labeled components, signal flows and functions in both FIGS. 2A and 2B will not be repeated for sake of brevity.

As shown, Correlators & Phase Detector block 117 includes in-phase correlator 115 in the first path (the first correlator path), in which the in-phase correlation signal (I) 116 is calculated. This signal is obtained when the first reference carrier 119, which is in phase with the carrier of the received input signal, is used in the correlator. Reference code 109 is a copy of the pseudo-random (PR) code that modulates the input signal. As a result of the correlation of these signals, the in-phase correlation signal (I) 116 is generated. Initially, or due to errors, the phase of the reference carrier can differ from the phase of the carrier of the received input signal, and the delay of the reference code can differ from the delay of the modulating code.

If the phase offset (e.g., phase shift) of the first reference carrier 119 is denoted as $\varphi$ and the time offset (e.g., time shift) of the reference code 109 relative to the input (modulating) code is denoted as $\tau$, then in-phase correlation signal (I) 116 can be determined according to the following relationship:

$$I = k \cdot U_s \cdot \mu \cdot R_0(\tau) \cdot \cos(\varphi) + I_{in}, \quad (1)$$

where:

$R_0(\tau)$ is the normalized cross-correlation function of the input PR code (after passing through the filter in the common radio path of the receiver) and the reference code, which is a locally-generated replica of the PR code which modulates the satellite signal;

$\cos(\varphi)$ is the result of the correlation between the carrier of the input signal and the in-phase reference carrier when phase shift is present;

$U_s$ is the amplitude of the input signal;

$\mu = \pm 1$ is the information symbol modulating the input signal;

k is the coefficient of proportionality; and $I_{in}$ is the interference at the output of correlator 115, which is generated as a result of additive interference at the input of the receiver.

The in-phase correlation signal (I) 116 is used for extracting the information symbols and, in the other paths, is used as an auxiliary signal for normalization. In the tracking mode, the values $\varphi$ and $\tau$ are negligible and $R_0(\tau) \cdot \cos(\varphi)$ approaches unity. At this stage, in-phase correlation signal (I) 116 copies the sequence of information (binary) symbols $\mu = \pm 1$ transmitting messages from on-board the navigation satellite to the user's navigation receiver. These messages contain some information about satellite coordinates, expected radio wave propagation conditions, and other data used in the coordinate determinations.

Correlators & Phase Detector block 117 includes quadrature correlator 120 in the second path (the second correlator path), in which the quadrature correlation signal (Q) 121 is calculated. This signal is generated if the second (quadrature) reference carrier whose phase is shifted through $\pi/2$ in relation to the first reference carrier 119, is used and the reference code 109 is identical to the reference code in the first path. The correlation of the signals (in correlator 120) generates the quadrature correlation signal (Q) 121, which is determined according to the following relationship:

$$Q = k \cdot U_s \cdot \mu \cdot R_0(\tau) \cdot \sin(\varphi) + Q_{in}, \quad (2)$$

where:

$Q_{in}$ is the interference at the output of correlator 120, which is generated by the additive interference at the input of the navigation receiver; and $\sin(\varphi)$ is the correlation result between the carrier of the input signal and the quadrature reference carrier.

Quadrature correlation signal (Q) 121 is used for generating an error signal in the PLL circuit, which will be described in further detail below.

During operation of navigation receiver apparatus 100, the magnitudes used in the above relationships (1) and (2) change and the respective correlation signals change as well. Signals I and Q generated in the paths of the Correlators & Phase Detector blocks (e.g., 117, 137, etc.) inside each DSC (e.g., DSC 110, 130, etc.) are used for the combined operation of the tracking systems, e.g., the phase-locked-loop (PLL) for tracking the carrier frequency.

As shown in FIGS. 2A and 2B, in-phase correlation signal (I) 116 and quadrature correlation signal (Q) 121 are provided as input to PLL discriminator 124 and the tracking error signal ($Z^{d,PLL}$) 125 in PLL discriminator 124 can be determined according to the following relationship:

$$Z^{d,PLL} = \arctan \frac{Q}{I}. \quad (3)$$

The dependence of $Z^{d,PLL}$ on $\varphi$ generates the discriminator characteristic of the PLL. Referring to FIGS. 1 and 3, the tracking error signal ($Z^{d,PLL}$) 125 is fed to a PLL loop filter 126 inside Loop Filter & PLL NCO block 118 of DSC 110. PLL loop filter 126 outputs control signals 301 ($Z_f$) and 302 ($Z_\varphi$) and closes the circuit of PLL 114 via first reference carrier (link) 119 (FIGS. 1 and 3), thereby controlling the frequency and phase shift of numerically-controlled oscillator (NCO) 128 in Loop Filter & PLL NCO block 118 in DSC 110.

The PLL tracking circuits represent closed circuits responsible for nulling (e.g., reducing to zero) the tracking errors $\varphi$. To implement, the tracking error signal ($Z^{d,PLL}$) 125 is transformed into control signals 301 ($Z_f$) and 302 ($Z_\varphi$), which change the frequency and phase of the oscillator of the reference signals. In real conditions, due to external effects on the tracking systems, the values of the tracking errors are not zero, but under normal conditions in the tracking mode, these errors are negligible.

The components, functions, and signal flows within DSC 130 are similar to those described for DSC 110 and will not be repeated here for sake of brevity. For example, Correlators & Phase Detector blocks 117 and 137, Loop Filter & PLL NCO blocks 118 and 138, tracking error signals ($Z^{d,PLL}$) 125 and 135, and so on.

According to an aspect of the disclosure, the sign associated with frequency shift in a given frequency band (frequency plan) is a factor for the quartz lock loop (QLL) operation when supporting multiple, different frequency bands and/or GNSS systems. For purposes of the description herein, the variables of interest include the sign associated with frequency shift in the quartz crystal oscillator. The quartz sign $Sign^s=+1$, if the last intermediate frequency (e.g., the frequency at the input of DSC path 110) decreases as quartz frequency increases, otherwise $Sign^s=-1$. For the following example, it will be assumed that the parameter $Sign^s$ is for indicating the sign of the frequency plan, with superscript "s" corresponding to the particular frequency band (e.g., L1, L2, L5, and so on) and for various navigation systems (e.g., GPS, GLONASS, Galileo, Beidou, etc.). The values for $Sign^s$ can be different even in the same navigation receiver for different frequency bands (e.g., for bands L1, L2, L5, B1, B2, E6 and so on). Moreover, the values for $Sign^s$ can vary significantly in different receivers. The table below illustrates this aspect in which $Sign^s$ values may vary depending on the receiver, the frequency bands, and the type of GNSS system (e.g., GPS, GLONASS, BeiDou and Galileo). These examples are meant to be illustrative only and not limiting in any manner, the point being that there will be differences depending on the systems and bands being supported by the embodiments described herein.

| Frequency band | Value for $Sign^s$ in Receiver Example 1 | Value for $Sign^s$ in Receiver Example 2 | GNSS System Type |
| --- | --- | --- | --- |
| L1 | −1 | +1 | GPS |
| L2 | +1 | −1 | |
| L5 | −1 | −1 | |
| L1 | −1 | +1 | GLONASS |
| L2 | +1 | −1 | |
| B1 | −1 | +1 | BeiDou |
| B2 | −1 | −1 | |
| E1 | −1 | +1 | Galileo |
| E5A and E5B | −1 | −1 | |

Referring back to FIG. 1, the individual DSC signals 123 from Correlators & Phase Detector block 117 in DSC 110 are provided as inputs to quartz-locked-loop (QLL) discriminator 170. Similarly, the individual DSC signals from the other DSCs would also be supplied as inputs to QLL discriminator 170. For example, individual DSC signal 132 from DSC 130 and individual DSC signals 131 from respective blocks from each of the other DSCs (e.g., 140, 150, 160, etc.) would also be supplied as inputs to QLL discriminator 170.

Referring back to FIG. 2A, Individual DSC Signal Generator block 122 generates two individual DSC signals based on in-phase correlation signal (I) 116 and quadrature correlation signal (Q) 121, namely, magnitudes (I·Q) and (I²). These magnitudes are fed via link 123 on the corresponding input of QLL Discriminator Block 170 in FIG. 1. In this embodiment, with the inputs from each of the DSCs, the common output signal 171 from QLL discriminator block 170 is generated according to the following relationship:

$$Z^{d,q} = \arctan\left[\frac{\sum_j\left(Sign^s \cdot I_j \cdot Q_j \cdot \frac{f_0^{ref}}{f_0^{j,s}}\right)}{\sum_j I_j^2}\right] \quad (4)$$

where:
j is the order number of some satellite signal (processed in some DSC) among all satellite signals of multiple bands and GNSS systems.

With regard to multiplier ($f_0^{ref}/f_0^{j,s}$) in the numerator of the arctangent function, $f_0^{j,s}$ designates the nominal value of the carrier frequency for the j-th satellite in the s-th frequency band. As an example, different satellites (1 . . . j) in a GNSS system may operate in different carrier frequencies even in the same frequency band, so $f_0^{j,s}$ therefore comprises index j. GLONASS is one example of a type of GNSS system where this occurs. Other GNSS systems (except for GLONASS) may operate on the same carrier frequency within a band, so in these circumstances, the index j in $f_0^s$ can be omitted for deriving the common output signal 171 from QLL discriminator 170.

Frequency $f_0^{ref}$ represents the carrier frequency for any GNSS system (e.g., GPS L2, Galileo E1, and so on). More specifically, in the example of frequency $f_0^{GPS,L1}$, the above relationship can be interpreted as allowing generation of an optimal (or possibly quasi-optimal) estimate of phase offset in radians between reference GPS L1 signals in different satellite PLLs and in signals generated from these satellites. This case refers to phase offset due to quartz instability (e.g., which is the same for all GPS L1 signals), rather than due to some other causes (e.g., thermal noise, multipath interference, ionosphere effects, and so on). These other causes bring about phase offsets that would be different for each satellite.

In another embodiment, illustrated in FIG. 2B, Individual DSC Signal Generator block 122 generates two other individual DSC signals, namely error tracking signal 125 ($Z^{d,PLL}$) and signal w, which will be described in further detail below. These magnitudes are also fed via link 123 on the corresponding input of QLL Discriminator block 170 in FIG. 1. In this embodiment, with the inputs from each of the DSCs, the common output signal 171 from QLL discriminator block 170 is generated according to the following relationship:

$$Z^{d,q} = \frac{\sum_j\left(Sign^s \cdot Z^{d,PLL,j} \cdot w_j \cdot \frac{f_0^{ref}}{f_0^{j,s}}\right)}{\sum_j w_j}. \quad (5)$$

The magnitude $w_j$ is, in fact, the weight of contribution of each DSC to the total sum and can be determined in many different ways. For example, $w_j$ can be the estimate of power of j-th satellite signal, or some combination of correlation signals 116 ($I_j$) and 121 ($Q_j$), such as ($I_j^2+Q_j^2$), or just ($I_j^2$).

Common output signal ($Z^{d,q}$) 171 is then further processed through QLL loop filter 180 to generate common guiding signal ($\alpha^{QLL} \cdot Z^{d,q}$) 181. Common guiding signal 181 is fed on to inputs of consequently-connected guiding blocks (e.g., guiding generators 182, 183, 190, etc.), which are configured to generate the individual guiding signals for each DSC, e.g., one guiding signal for each DSC represented in GNSS navigation receiver apparatus 100. More specifically, these guiding blocks (e.g., 182, 183, 190, etc.) are configured to multiply common guiding signal ($\alpha^{QLL} \cdot Z^{d,q}$) 181 by coefficient Sign$^s$, and the ratio of frequencies ($f_0^{j,s}/f_0^{ref}$), according to the following relationship:

$$Z_j^{d,q} = \alpha^{QLL} \cdot \text{Sign}^s \cdot \frac{f_0^{j,s}}{f_0^{ref}} \cdot Z^{d,q}. \tag{6}$$

Guiding signal ($Z_j^{d,q}$) is a guiding signal for discrete phase control of the respective NCO in each DSC of the j-th satellite (e.g., NCO 128 in DSC 110, etc.). As shown in FIG. 3, guiding signal ($Z_j^{d,q}$) 184 is provided to Loop Filter & PLL NCO block 118 in DSC 110, where, additively with control signal 302, is fed on input PLL NCO 128 to control phase shift via signal 119. Similarly, guiding signal ($Z_j^{d,q}$) 185 is provided to Loop Filter & PLL NCO block 138 in DSC 130, and other guiding signals (e.g., 191, etc.) are provided to other respective DSCs, and so on.

When dynamic effects are absent, tracking errors of carrier phase in the DSC of the j-th satellite is determined as a satellite's energy potential $C_j/N_0$ (the ratio of carrier frequency power for the j-th satellite to the spectral density of receiver's thermal noise and noise introduced by the common quartz noise). The less the value of $\alpha^{QLL}$, the less noise will be introduced. According to an aspect, if the number of navigation satellites is large enough, the introduced noise becomes insignificant and can be ignored, and then the value of $\alpha^{QLL}$ can be set $\alpha^{QLL}=1$.

Figure 4:
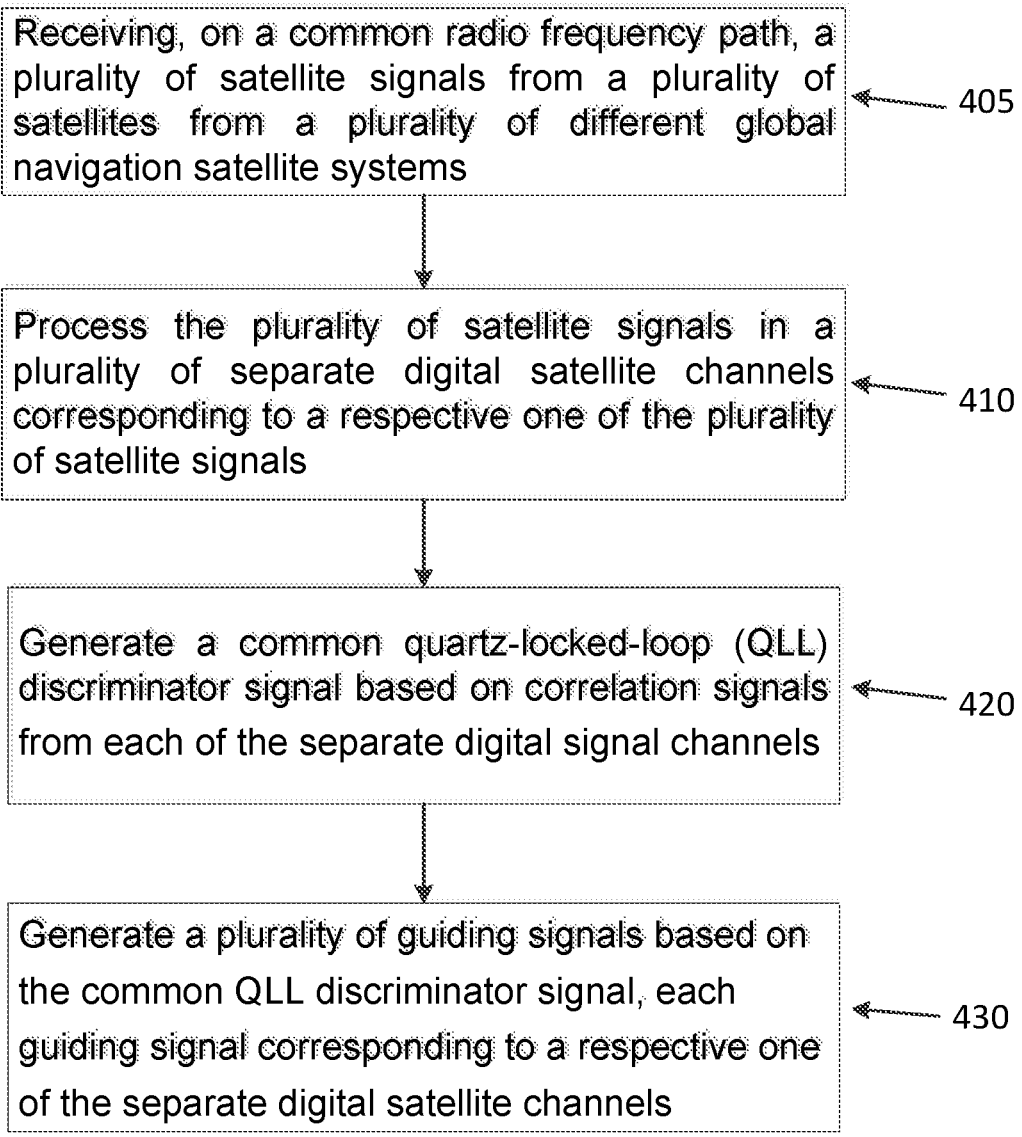
FIG. 4 is a flowchart showing a method in accordance with one or more embodiments.

FIG. 4 shows method 400 for processing satellite signals in a navigation receiver, such as navigation receiver apparatus 100 in FIG. 1. Step 405 comprises receiving, on a common radio frequency path, a plurality of satellite signals from a plurality of satellites from a plurality of different global navigation satellite systems. In step 410, the plurality of received satellite signals are processed in a plurality of separate digital satellite channels, each of the separate digital satellite channels corresponding to a respective one of the plurality of satellite signals. In step 420, a common quartz-locked-loop (QLL) discriminator signal is generated based on correlation signals from each of the separate digital signal channels. Based on the common QLL discriminator signal generated in step 420, a plurality of guiding signals are generated in step 430, each of the plurality of guiding signals corresponding to a respective one of the separate digital satellite channels. In this manner, each guiding signal is operable to reduce phase-related tracking errors in the respective satellite signal processed in its corresponding digital satellite channel.

It should be noted that, for clarity of explanation, the illustrative embodiments described herein may be presented as comprising individual functional blocks or combinations of functional blocks. The functions these blocks represent may be implemented using any combination of hardware, software and/or firmware. Illustrative embodiments may comprise digital signal processor ("DSP") hardware and/or software performing the operations described herein. In one or more embodiments, a processor may be used for performing and/or controlling certain functions. Processors may be implemented in various configurations and may include general and special purpose microprocessors, application-specific integrated circuits (ASICs), field programmable gate arrays (FPGAs), and the like. Thus, it will be appreciated by those skilled in the art that the block diagrams herein represent conceptual views of illustrative functions, operations and/or circuitry of the principles described in the various embodiments herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for processing satellite signals, the method comprising:
    receiving, on a common radio frequency path, a plurality of satellite signals from a plurality of satellites from a plurality of different global navigation satellite systems;
    processing the plurality of satellite signals in a plurality of separate digital satellite channels, wherein each of the separate digital satellite channels corresponds to a respective one of the plurality of satellite signals;
    generating a common quartz-locked-loop (QLL) discriminator signal based on correlation signals from each of the separate digital satellite channels; and
    generating a plurality of guiding signals based on the common QLL discriminator signal, each of the plurality of guiding signals corresponding to a respective one of the separate digital satellite channels, for reducing phase-related tracking errors in the respective one of the plurality of satellite signals processed in a corresponding one of the separate digital satellite channels.

2. The method of claim 1, wherein the common QLL discriminator signal, represented as $Z_i^{d,q}$, is generated according to the relationship:

$$Z_i^{d,q} = \arctan\left[\frac{\sum_j \left(\text{Sign}^s \cdot I_{i,j} \cdot Q_{i,j} \cdot \frac{f_0^{ref}}{f_0^{j,s}}\right)}{\sum_j I_{i,j}^2}\right],$$

where:
i is a unit of time;
j is a satellite number;
Sign$^s$ is a sign of a frequency plan for signals of an s-th frequency band of carrier satellite signals;
$I_{i,j}$ and $Q_{i,j}$, are samples of in-phase and quadrature components, respectively;
$f_0^{ref}$ is a reference carrier frequency; and
$f_0^{j,s}$ is a nominal value of carrier frequency for the j-th satellite in the s-th frequency band.

3. The method of claim 1, wherein the common QLL discriminator signal, represented as $Z_i^{d,q}$, is generated according to the relationship:

$$Z_i^{d,q} = \frac{\sum_j \left(\text{Sign}^s \cdot Z_{i,j}^{d,PLL} \cdot w_{i,j} \cdot \frac{f_0^{ref}}{f_0^{j,s}}\right)}{\sum_j w_{i,j}},$$

where i is a unit of time;

j is a satellite number;

$Z_{i,j}^{d,PLL}$ is a PLL discriminator signal in a digital satellite channel of the j-th satellite;

$\text{Sign}^s$ is a sign of a frequency plan for signals of an s-th frequency band of carrier satellite signals;

$f_0^{ref}$ is a reference carrier frequency;

$f_0^{j,s}$ is a nominal value of carrier frequency for the j-th satellite in the s-th frequency band; and $w_{i,j}$ is a weight of the j-th satellite.

4. The method of claim 3, wherein the weight $w_{i,j}$ is calculated according to the relationship:

$$w_{i,j} = C_{i,j},$$

where:

i is a unit of time;

j is a satellite number; and $C_{i,j}$ is a power of the j-th satellite signal.

5. The method of claim 3, wherein the weight $w_{i,j}$ is calculated according to the relationship:

$$w_{i,j} = I_{i,j}^2 + Q_{i,j}^2,$$

where:

i is a unit of time;

j is a satellite number; and $I_{i,j}$ and $Q_{i,j}$, are samples of in-phase and quadrature components, respectively.

6. The method of claim 3, wherein the weight $w_{i,j}$ is calculated according to the relationship:

$$w_{i,j} = I_{i,j}^2,$$

where:

i is a unit of time;

j is a satellite number; and $I_{i,j}$, is a sample of an in-phase component.

7. The method of claim 1, wherein each of the plurality of guiding signals, represented as $Z_{i,j}^{d,q}$, is generated according to the relationship:

$$Z_{i,j}^{d,q} = \alpha^{QLL} \cdot \text{Sign}^s \cdot \frac{f_0^{j,s}}{f_0^{ref}} \cdot Z_i^{d,q},$$

where:

i is a unit of time;

j is a satellite number;

$\alpha^{QLL}$ is a proportionality coefficient of feedback;

$\text{Sign}^s$ is a sign of a frequency plan for signals of an s-th frequency band of carrier satellite signals;

$f_0^{ref}$ is a reference carrier frequency;

$f_0^{j,s}$ is a nominal value of carrier frequency for the j-th satellite in the s-th frequency band; and $Z_i^{d,q}$ is the common QLL discriminator signal.

8. The method of claim 7, wherein the proportionality coefficient of feedback $\alpha^{QLL}$ can assume values within a range defined by $\alpha^{QLL} \in (0;1]$.

9. The method of claim 1, wherein the plurality of different global navigation satellite systems includes at least two systems selected from the group consisting of at least a Global Positioning System (GPS), a Global Navigation Satellite System (GLONASS), a BeiDou navigation system, and a Galileo navigation system.

10. An apparatus for processing satellite signals, the device comprising:

a radio frequency processor configured to receive, on a common radio frequency path, a plurality of satellite signals from a plurality of satellites from a plurality of different global navigation satellite systems;

a plurality of separate digital satellite channels, each configured to process a respective one of the plurality of satellite signals;

a quartz-locked-loop (QLL) discriminator configured to generate a common QLL discriminator signal based on correlation signals from each of the separate digital satellite channels; and a QLL loop filter configured to generate a plurality of guiding signals based on the common QLL discriminator signal, each of the plurality of guiding signals corresponding to a respective one of the separate digital satellite channels, for reducing phase-related tracking errors in the respective one of the plurality of satellite signals processed in a corresponding one of the separate digital satellite channels.

11. The apparatus of claim 10, wherein the QLL discriminator is configured to generate the common QLL discriminator signal, represented as $Z_i^{d,q}$, according to the relationship:

$$Z_i^{d,q} = \arctan\left[\frac{\sum_j \text{Sign}^s \cdot I_{i,j} \cdot Q_{i,j} \cdot \left(\frac{f_0^{ref}}{f_0^{j,s}}\right)}{\sum_j I_{i,j}^2}\right],$$

where:

i is a unit of time;

j is a satellite number;

$\text{Sign}^s$ is a sign of a frequency plan for signals of an s-th frequency band of carrier satellite signals;

$Q_{i,j}$ and $I_{i,j}$, are samples of in-phase and quadrature components, respectively;

$f_0^{ref}$ is a reference carrier frequency; and $f_0^{j,s}$ is a nominal value of carrier frequency for the j-th satellite in the s-th frequency band.

12. The apparatus of claim 10, wherein the QLL discriminator is configured to generate the common QLL discriminator signal, represented as $Z_i^{d,q}$, according to the relationship:

$$Z_i^{d,q} = f_0^{ref} \cdot \frac{\sum_j \left(Z_{i,j}^{d,PLL} \cdot \text{Sign}^s \cdot \frac{w_{i,j}}{f_0^{j,s}}\right)}{\sum_j w_{i,j}},$$

where i is a unit of time;

j is a satellite number;

$Z_{i,j}^{d,PLL}$ is a PLL discriminator signal in a digital satellite channel of the j-th satellite;

$\text{Sign}^s$ is a sign of a frequency plan for signals of an s-th frequency band of carrier satellite signals;

$f_0^{ref}$ is a reference carrier frequency;

$f_0^{j,s}$ is a nominal value of carrier frequency for the j-th satellite in the s-th frequency band; and $w_{i,j}$ is a weight of the j-th satellite.

13. The apparatus of claim 12, wherein the weight $w_{i,j}$ is calculated according to the relationship:

$$w_{i,j} = C_{i,j},$$

where:

i is a unit of time;

j is a satellite number; and $C_{i,j}$ is a power of the j-th satellite signal.

14. The apparatus of claim 12, wherein the weight $w_{i,j}$ is calculated according to the relationship:

$$w_{i,j} = I_{i,j}^2 + Q_{i,j}^2,$$

where:

i is a unit of time;

j is a satellite number; and $Q_{i,j}$ and $I_{i,j}$, are samples of in-phase and quadrature components, respectively.

15. The apparatus of claim 12, wherein the weight $w_{i,j}$ is calculated according to the relationship:

$$w_{i,j} = I_{i,j}^2,$$

where:

i is a unit of time;

j is a satellite number; and $I_{i,j}$, is a sample of an in-phase component.

16. The apparatus of claim 10, wherein the QLL loop filter is configured to generate the plurality of guiding signals, represented as $Z_{i,j}^{d,q}$, according to the relationship:

$$Z_{i,j}^{d,q} = \alpha^{QLL} \cdot \text{Sign}^s \cdot \frac{f_0^{j,s}}{f_0^{ref}} \cdot Z_i^{d,q},$$

where:

i is a unit of time;

j is a satellite number;

$\alpha^{QLL}$ is a proportionality coefficient of feedback;

$\text{Sign}^s$ is a sign of a frequency plan for signals of an s-th frequency band of carrier satellite signals;

$f_0^{ref}$ is a reference carrier frequency;

$f_0^{j,s}$ is a nominal value of carrier frequency for the j-th satellite in the s-th frequency band; and $Z_i^{d,q}$ is the common QLL discriminator signal.

17. The apparatus of claim 16, wherein the proportionality coefficient of feedback $\alpha^{QLL}$ can assume values within a range defined by $\alpha^{QLL} \in (0;1]$.

18. The apparatus of claim 10, wherein the plurality of different global navigation satellite systems includes at least two systems selected from the group consisting of at least a Global Positioning System (GPS), a Global Navigation Satellite System (GLONASS), a BeiDou navigation system, and a Galileo navigation system.

\* \* \* \* \*